July 24, 1962 F. G. STEELE 3,045,912

VELOCITY QUANTIZER

Filed Aug. 29, 1958 4 Sheets-Sheet 1

INVENTOR:
Floyd G. Steele

By Marvin H. Kleinberg
Attorneys

INVENTOR:
Floyd G. Steele
By Marvin H. [signature]
Attorney

July 24, 1962 F. G. STEELE 3,045,912

VELOCITY QUANTIZER

Filed Aug. 29, 1958 4 Sheets-Sheet 3

INVENTOR:
Floyd G. Steele

By Marvin H. Weinberg
Attorney

July 24, 1962 F. G. STEELE 3,045,912

VELOCITY QUANTIZER

Filed Aug. 29, 1958 4 Sheets-Sheet 4

INVENTOR:
Floyd G. Steele
By Marvin H. Kleinberg
Attorney.

United States Patent Office 3,045,912
Patented July 24, 1962

3,045,912

VELOCITY QUANTIZER

Floyd G. Steele, La Jolla, Calif., assignor to Digital Control Systems, Inc., La Jolla, Calif.

Filed Aug. 29, 1958, Ser. No. 758,086
23 Claims. (Cl. 235—151)

This invention relates to quantizers and more particularly to methods and apparatus for deriving a digital signal representation of the velocity and position of a moving member.

In many information handling and data processing systems, information, readily available in an anolog form, such as voltage, displacement, or velocity is desired in a digital form, in which discrete bi-level signals represent, numerically, the analog quantity. Analog-to-digital converting devices are well known in the art and have been described, at great length, in many publications.

One of the more common methods of analog-to-digital conversion may be termed the "coded pattern" technique. An analog signal input is converted into motion of a movable member, and the position of the member, relative to a starting or reference point, gives rise to a distinctive coded signal combination. Each signal combination represents, in a numerical code, the quantized displacement of the member from the starting or reference point. The coding pattern itself functions as a counter, providing a serially ordered sequence of combinations of signals representing, respectively, a corresponding serially ordered sequence of displacements.

For example, a disk may be divided into eight equal sectors or quanta, each identified by a number from 0–7, arranged in order around the disk. A fixed pointer can be used to select or sample the position of the disk at any time. The disk is rotated from a known starting position, for instance, with the pointer over sector 0, and at a later time a sampling can be made and the new position noted. If the amount of rotation allowed in the time interval between observations is unlimited, then the direction and magnitude of the movement is indeterminate, and only the final position can be ascertained.

To illustrate, assume that at the end of a first sampling interval the pointer is observed in sector 6. The total displacement during the interval can be either six sectors plus some indeterminate multiple of one revolution in a positive direction or, two sectors plus some equally indeterminate multiple of one revolution in a negative direction. However, if the velocity of the disk is limited so that the disk rotates less than one-half of a revolution in any sampling interval, displacements of less than four sectors are unambiguously interpreted as positive displacements, and apparent displacements of more than four sectors may be properly recognized as negative displacements of less than four sectors, thereby providing an indication of direction. Thus, in the prior art, the disk and pointer alone are sufficient to provide an indication of velocity in terms of displacement per sampling interval only if the velocity is less than one half of a revolution per sampling interval.

It may be seen from this example, that there is a limitation upon the magnitude of the velocity that can be measured, which is inherent in coded pattern encoders of the prior art. By increasing the frequency of sampling (thereby shortening the time of the sampling interval) or by increasing the size of the individual quanta and consequently reducing the resolution of the encoder, the measurable velocity can be increased correspondingly, but the limitation still exists.

A second form of encoder, using a so-called "incremental" technique which detects only single unit or quantum changes in position is also in wide use. A separate counting means is needed to accumulate the single units or increments. The disk and pointer mentioned above may be used in this manner also. Changes from sector to sector are detected and the sectors are not otherwise distinguished. A counter must be included to accumulate the number of changes during a sampling interval. At the beginning of each sampling interval, the counter is reset to zero and the total number of changes during each interval is recorded. The number in the counter at the end of the interval represents total displacement. If the member moves only in one direction, the counter output at the end of each interval represents velocity in terms of sectors per timing interval.

Using the incremental technique, the capacity of the counter must exceed the numerical value of the velocity of the moving member in a single direction, expressed in terms of changes per sampling interval. Without such a limitation, it is possible for the counter to recycle, resulting in an erroneous count. Therefore, this technique too, requires that velocity be limited. As above, shortening the sampling interval or decreasing the resolution can change the limit in particular instances.

The information provided by the encoder or quantizer is frequently used in digital data processing operations. Quantized signals, representing the magnitude of a physical quantity, which, in the case of a moving member, may be displacement or velocity, are usually stored in a memory until the quantities can be used in computations.

In real-time process control systems, especially, computations may proceed at relatively slow speeds, permitting the use of inexpensive, large capacity, long access time storage devices for both storage and recirculating of number signals representing physical quantities. If velocities are involved in the computation, the computation and access cycle of the slow storage devices are often incompatible with the faster sampling rates usually necessary to resolve high velocities in the prior art quantizers. To permit assimilation of data from the quantizer which is sampled at a rapid rate, some form of buffer storage, such as a high speed counter or other rapid access high speed storage device, must be provided to hold information until it is utilized.

The use of a low cost storage device such as a magnetic drum, requires a buffer that can both store and accumulate information from the quantizer at a rapid sampling rate and periodically transmit the accumulated information to the slower device at a rate compatible with the computational cycle. Buffer storage devices are usually quite complex and costly, as well as difficult to maintain in reliable operation. It would be highly desirable, therefore, to avoid their use by going to longer sampling intervals. However, it is equally desirable to have a system that can quantize large velocities without requiring extra equipment for recording direction of motion and recycling of the code, which is best achieved with shorter sampling intervals. What is needed, and what is provided by the present invention is a system that can quantize an analog quantity to provide a representation of net change and rate of change without limitation upon the rate of change.

According to the present invention, quantizer output is sampled and stored and a quantity representing the rate of change of a rate of change, or the second difference, is derived from successive quantizer samplings. A second difference value, if integrated or summed once, results in a quantity equal to a rate of change or velocity. If the velocity quantity is then summed, a quantity representative of the total displacement is produced.

A second difference can be computed from at least three successive quantizer samplings, some of which may be held in the low speed storage device. Each derived second difference, when added to a number stored in the low speed storage device representing rate of change or velocity, results in a current representation of the rate of change. A number representing total displacement is also available if the successive velocity representations are summed.

A great advantage accrues from the use of a calculated second difference value. It is possible to use a coded pattern encoder without any limitation on velocity of the moving member. In such applications, displacements involving multiple code cycles can be treated as displacements involving a single code cycle, as can be seen in the following example using the sectored disk and pointer mentioned above.

Assume that in three successive samplings, the pointer is over sectors numbered 2, 5, and 7. If the velocity of the disk is small so that the actual displacements in each interval are 3 sectors (between sector 2 and sector 5) and 2 sectors (between sector 5 and sector 7) in the positive direction, the second difference, which is the difference of the differences (2 sectors less 3 sectors) is −1 sector per sampling interval, per interval. Consider still another situation in which the velocity of the disk is greater and the successive displacements are 19 sectors per interval and 18 sectors per interval in the positive direction, respectively, in which case the second difference is still −1 sector per interval per interval. If motion happens to be in the negative direction at a low velocity, the successive displacements of, for instance, −5 sectors per interval and −6 sectors per interval, give rise to a second difference value of −1. It may be seen that for each given three sampled value a particular second difference value is derived which is independent of the magnitude of the velocities (assuming reasonably small accelerations).

The sampling intervals can be increased to encompass multiple code cycles, since recycling of the code introduces no ambiguities. A sampling rate which equals the access time of the slow speed storage device can easily be attained. In fact, the sampling rate can be synchronized to virtually any computational cycle within the data processor, thereby eliminating all need for a buffer storage device. It is also possible to simultaneously decrease the area of the individual sectors or quanta, thereby increasing the resolution of the quantizer without loss of accuracy. Signals representing the numerical value of velocity can be kept current by adding each newly derived second difference value into a recirculating number representing a velocity value. Negative second differences, when added, decrease velocity value, and positive second differences increase the velocity value.

In a specific embodiment of the present invention, a so-called "unit distance" code pattern, such as the Gray, or reflected binary code, is cyclically generated by an encoder which is coupled to the output of an analog signal source, in this instance the shaft of a motor. Only rotational displacements of the shaft within an 8 quantum distance interval can produce a different quantized bilevel signal representation for each of the quanta.

The unit distance code is used to limit quantization ambiguities since, unlike the binary code, code combinations representing adjacent positions differ only by a single digit. The bilevel signals, representing position in Gray code, are periodically sampled and converted to the equivalent binary code value. Each position sampling is held in storage for one sampling interval and, using binary subtraction, is combined in the next interval with a new position sampling. A resultant bilevel signal combination, representing the first difference of the positions represented by the sampled signals is derived and held in storage for one interval. Each new first difference signal has subtracted from it the first difference signal which was generated and stored in the prior sampling interval. A bilevel signal combination representing the second difference of positions is thereby derived which is added into an accumulator. The accumulator circulates a bilevel signal combination representing a numerical velocity value. Each second difference value is added to correct the velocity value in the accumulator and keep it current. If desired, the number in the accumulator itself can be summed in a second accumulator to provide a numerical representation of position or displacement of the shaft.

In a second embodiment of the invention, logic circuits combine each group of position sampling signals directly with the groups of signals representing the two prior position samplings to produce a bilevel output signal combination which represents the second difference of the three position samplings.

Accordingly, it is an object of the present invention to provide a combination of bilevel signals representing quantized velocity and displacement of a moving member at a sampling rate independent of the velocity and displacement of a moving member;

It is a further object of the invention to provide a quantized representation of the velocity of a moving member wherein the velocity that can be quantized is independent of the sampling rate of the quantizer;

It is a still further object of the invention to provide a quantizer for generating a combination of digital signals representing the velocity of a moving member by combining two successive samplings of the position of the member to derive a difference and combining two successive differences to derive a second difference, which is accumulated to represent a velocity value;

It is a still further object of the invention to derive from a bidirectional quantizer, signals representing the velocity of a moving member by combining three successive samplings of the position of said member as a second difference of position;

It is an additional object of invention to permit a periodic sampling of an analog-to-digital encoder to derive a position signal, derive a first difference from successive position signals, derive a second difference from successive first differences, and to sum the successive second differences into a representation of velocity and sum successive representations of velocity into a representation of displacement.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
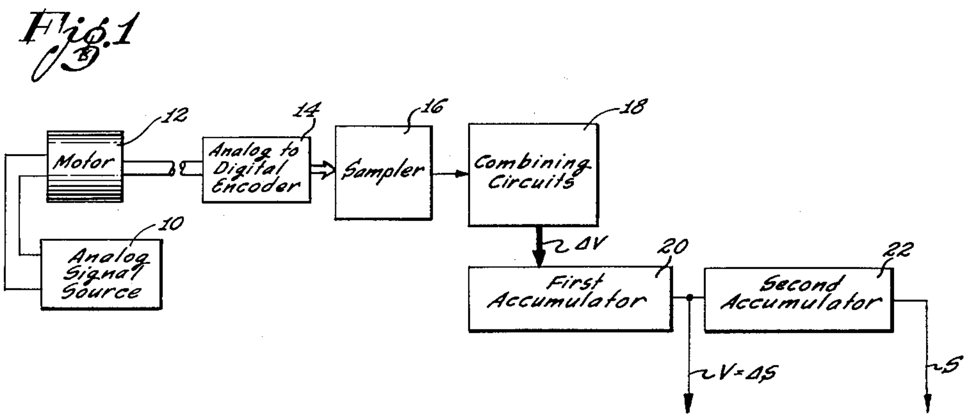
FIGURE 1 is a block diagram of a quantizer according to the present invention.

With reference to FIG. 1, a quantizing system according to the present invention is shown, in block diagram form. An analog signal source 10, provides analog electrical signals to a motor 12 which converts the analog quantity into the motion of a shaft or other member.

The motor 12 is connected to an analog-to-digital encoder 14 which produces bilevel electrical signal combinations, each representing a different quantized position of the motor shaft. The encoder 14 applies the bilevel electrical signal combinations to a sampler 16, which, at regular predetermined intervals, produces output signals corresponding to the output of the encoder 14 at that instant.

The output of the sampler 16 is connected to a combining circuit 18 which operates on successive sampled signal combinations to produce bilevel signal combinations, ΔV, representing the second difference of the change of the analog signal in the time between individual samplings. The output of the combining circuit 18 is connected to a first accumulator 20 which adds the quantity represented by the output signals of the combining circuit 18 to a quantity representing the rate of change of the analog signal, ΔS, that is stored in the first accumulator 20. The output of the first accumulator 20 is connected to a second accumulator 22, which provides a bilevel signal output representing the net change in the analog signal, S.

Figure 2:
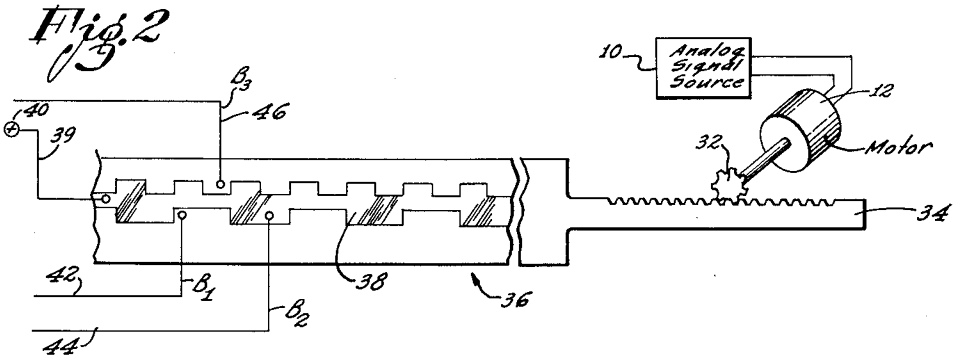
FIGURE 2 is a side view of coded pattern encoder which converts translational position into a bilevel signal combination suitable for use in the system of FIGURE 1.
Figure 3:
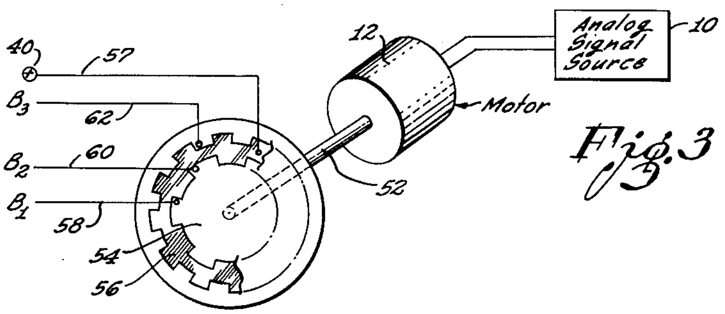
FIGURE 3 is a side view of a coded pattern encoder which converts rotational position into a bilevel signal combination suitable for use in the system of FIGURE 1.

In FIGURES 2 and 3, coded pattern encoders are shown which may be used in the present invention. The encoder of FIG. 2 is designed to quantize translational motion and, the encoder of FIG. 3 quantizes rotational motion, each encoder providing a bilevel signal combination representing the position of the encoder. Turning first to FIG. 2, a source of analog signals 10 is connected to a motor 12 which converts the analog signals into rotational motion. Connected to the motor is a pinion 32 which engages a rack portion 34 of a movable member 36. The movable member 36 may be a part of the bed of a milling machine, for example.

A coded pattern 38 is placed on the movable member 36 and is accurately patterned to close tolerances so that the member 36 is divisible into a plurality of identical incremental quanta of length. The code pattern 38 may either be electrically conducting on a non-conducting background or, may be a non-conducting pattern on a conducting background. In an optical system, the pattern may be an opaque portion of a transparent member or, conversely, a transparent portion of an opaque member. A wiper 39, connected to a source of potential 40 applies potentials to the conductive portion of the pattern 38. Three transducing elements are connected to cooperate with the coded pattern 38.

In the embodiment shown, the transducing members are conductive brushes 42, 44, 46 which, in contact with the conductive pattern 38 on the member 36, are positioned to generate a Gray or reflected binary code, representing the position of the movable member 36 relative to a reference point. The individual brushes, when in contact with the conductive pattern 38 are at the potential of the source, which represents a binary "1" signal. Absence of the potential is considered a binary "0" signal. Table 1 sets forth the Gray code sequence and its decimal and binary equivalents:

*Table 1*

| Decimal | Gray | Binary |
|---|---|---|
| 0 | 000 | 000 |
| 1 | 001 | 001 |
| 2 | 011 | 010 |
| 3 | 010 | 011 |
| 4 | 110 | 100 |
| 5 | 111 | 101 |
| 6 | 101 | 110 |
| 7 | 100 | 111 |

In FIGURE 3, a rotational analog-to-digital encoder is shown which converts rotary motion directly into digital signals. An analog signal source 10 is connected to a motor 12 which imparts rotational motion to a shaft 52. The shaft 52 is connected to a disk 54, which carries a coded pattern 56. As above, the pattern may either be a conducting segment on a non-conducting disk or vice versa. Similarly, in an optical system, the pattern can be an opaque portion of a transparent member or the transparent portion of an opaque member. A wiper contact 57 connects the coded pattern to a source of potential 40.

A set of three transducers, here conducting brushes, 58, 60, 62 are placed in contact with the disk 54 to generate a Gray coded signal combination of high and low level signals representing respectively, 1's and 0's for indicating total rotational motion or angular displacement from a fixed reference point.

The Gray code patterns shown in FIGS. 2 and 3 provide eight signal combinations which represent respectively, eight discrete incremental quanta of position and which repeat to identify eight additional quanta. To resolve ambiguities as to the direction of displacement, all displacements greater than 4 quanta are considered negative quantities, as shown in Table 2, below.

*Table 2*

| Position | | Displacement From 0 | Binary Code For 1st Difference |
|---|---|---|---|
| Gray | Binary | | Binary |
| 000 | 000 | 0 | 000 |
| 001 | 001 | +1 | 001 |
| 011 | 010 | +2 | 010 |
| 010 | 011 | +3 | 011 |
| 110 | 100 | +4 | 100 |
| 111 | 101 | −3 | 101 |
| 101 | 110 | −2 | 110 |
| 100 | 111 | −1 | 111 |

For example, with the reference position chosen to be "0," an initial transition from 000 to 101 (in Gray) can represent either a displacement of +6 units in the positive direction or a displacement of −2 units in the negative direction. Similarly, a transition from 101 (Gray) to 011 can be interpreted as a displacement of 4 units, but the direction of displacement is uncertain.

In prior art systems, the directional ambiguity has been resolved either by shortening the sampling interval or lengthening the quantum, so that in any interval, the change of position can not exceed 3 quanta. Therefore, in prior art systems, readings of ±4 or +6 do not occur and the Gray quantity, 101 can be interpreted as −2.

In the present invention, even though the displacement in any sampling interval can be unlimited and displacements greater than 3 quanta are easily accommodated, signals representing displacements greater than one half of a code cycle can be treated as negative quantities which greatly simplifies setting up the computation circuits. Further, because of the cyclical nature of the code pattern, and, since second differences are being computed, it is possible to treat displacements involving multiple cycles of the code, as though they were displacements within a single cycle.

Consider, for example, that successive samplings provide an initial (Gray) signal combination of 000, followed by 101 and 011. Using Table 2 (if it is assumed that the member is slowly rotating in a negative direction), the second sampling is interpreted as −2 quanta from 0 and, at the third sampling, the position is −6 quanta which is read as +2 quanta from 0. The first displacement or first difference between the initial and second positions is −2 quanta and between the second and third positions is −4 quanta, which gives a second difference value of −2 quanta. Consider an alternative interpretation, in which the member is rotating in a positive direction and in which the second position is assumed to be +6 quanta which is read as −2 quanta from 0 and the third position is +2 quanta from 0. If the first displacement is 6 units and the second displacement is considered to be 4 units, then the second difference is −2 as before.

To prevent ambiguities as to direction and quantity in the present invention, an acceleration limitation is imposed. The second difference in the present example can not exceed 3 quanta to sustain reliable operation. The limitation has only slight significance since, in the physical world, accelerations are directly related to the available forces, which are limited.

Virtually any quantizer can be used in practicing the present invention. The maximum acceleration measurable by a given quantizer depends upon the number of quanta into which the encoder can divide a displacement before recycling. If a quantizer, such as the abovementioned sectored disk, divides a single revolution of a rotating member into 8 equal quanta, then the second difference should not exceed 3 quanta. If a 16 sector disk is used, the second difference limit is then 7 quanta. Generalizing, if "$n$" is the number of quanta per quantizer cycle, then the second difference or acceleration must be less than $n/2$ quanta.

A more important limitation upon acceleration is caused by the quantizing process itself. In any quantizer, a choice must be made at each boundary where a transition between two values is made and the system selects which value to read. Unit distance codes, such as Gray, limit the decision to the single digit that changes when representing the new position. Consider for example, that the eight sectored disk has a constant velocity of one sector or quantum per time interval and that in successive samplings, the pointer selects sectors 0, 0, 2, 3, 4.

At the first of the samplings assume that the true position is the boundary between sector 7 and sector 0 and that a reading representing "0" is generated. In the second interval, the transducer is again on a boundary, between "0" and "1" and a "0" is again generated. At the third interval, a boundary is again reached, but this time a reading of "2" is generated, and a first difference value of "2" quanta is derived. Although there was no change in velocity, a "0" velocity was recorded during one interval and a velocity of 2 was recorded in the next interval resulting in an apparent acceleration of +2. To continue, the next reading is 3, giving rise to first difference of 1 and a second difference of −1. The succeeding reading of 4 gives rise to a first difference of 1 and a second difference of 0. Accumulating the second differences to this point, however, results in the correct velocity value of 1. Apparent, rather than true accelerations up to 2 quanta may therefore be included in any quantized second difference.

These apparent accelerations do not result from incorrect information, but merely are the result of a mechanical decision each time a choice of two equally valid values is presented.

To avoid any possibility of ambiguity, it is preferable to allow for apparent accelerations when considering a limitation upon measured second differences. As pointed out above, apparent accelerations up to two quanta are possible so that in an "$n$" state quantizer, a limit of acceleration to less than $$\frac{n}{2}-2$$

quanta is adequate. For an 8 sectored disk, the allowable physical accelerations should be less than 2 quanta per interval per interval. If a one inch diameter code disk is being sampled once during each revolution of a 60 c.p.s. storage system, the linear accelerations of a point on the circumference of the disk would have to be in excess of some 7 $g$'s before the measured second difference exceeds two quanta per interval per interval.

Figure 4:
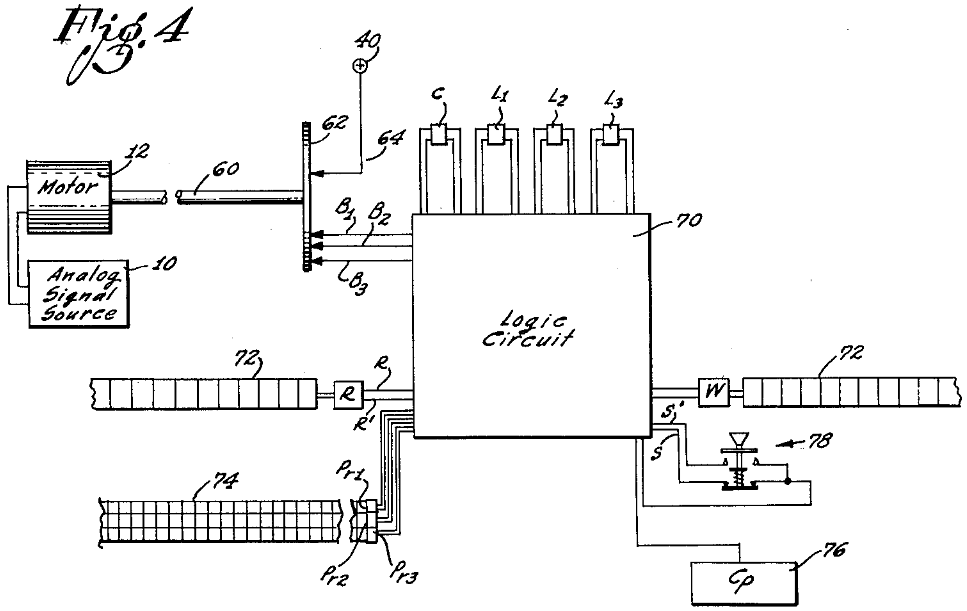
FIGURE 4 is a block diagram of a specific embodiment of the invention of FIGURE 1.

In FIG. 4, a preferred embodiment of the present invention is shown in block form. A source of analog signals 10, is connected to a motor 12 to convert the analog quantity into rotation of a shaft 60. A coded pattern analog-to-digital encoder 62 is connected to the shaft 60. A wiper brush 64 connects the pattern to a source of potential 40. A set of three signal lines $B_1$, $B_2$, $B_3$ connects the output of the encoder 62 to a logic circuit 70. The logic circuit 70 includes necessary "and" and "or" gates for performing the logical operations which are set forth in the logical equations below. The logic circuit 70 also is connected to a plurality of flip-flops or bistable-multivibrators. In the present embodiment, four flip-flops are used for the performance of logical operations and are designated, respectively, the C, or carry flip-flop, and the logic flip-flops $L_1$, $L_2$, and $L_3$.

A circulating storage register is connected to an R, or read flip-flop which is connected to the logic circuit 70. The logic circuit 70 is also connected to a W or write flip-flop, which enters information into the storage register 72. Another circulating register, the program register 74, contains program instructions. A clock pulse generator 76, generates a succession of equally spaced timing or clock pulses, CP, which are applied to synchronize the various elements of the system.

For flexibility, at least three program channels are used in the program register 74. Three program read flip-flops $Pr_1$, $Pr_2$, $Pr_3$, are connected to the logic circuit 70, to generate a group of program signals $P_1$, $P_2$, $P_3$, and their complements. Using the three channels provides at least eight unique signal combinations for performing different operations. If the quantizer of the present invention is incorporated into larger system, and additional instructions are needed, an extra program channel can double the number of available instructions so that four program channels can provide 16 instructions.

A start push button 78 provides signals S and S′ to enable the commencement of operation after the system first has had the opportunity to settle into a steady condition with constants entered into the registers.

Table 3, set forth below, lists the program instructions available with three program channels, and, after each of these instructions, sets forth the function of each.

*Table 3*

| No. | Instruction | Code Designation | | | Octal Equivalent Equations |
|---|---|---|---|---|---|
| | | $P_1$ | $P_2$ | $P_3$ | |
| (1) | Read brushes $B_1$, $B_2$, $B_3$ into the logic flip-flops $L_1$, $L_2$, $L_3$, respectively | 0 | 0 | 0 | 0 |
| (2) | Convert Gray code into Binary code | 0 | 0 | 1 | 1 |
| (3) | Write $L_3$ into W, subtract R from $L_3$, placing the result in $L_3$ and the carry (if any) in C | 0 | 1 | 0 | 2 |
| (4) | Add R to $L_3$, place the sum in W and the carry in C | 0 | 1 | 1 | 3 |
| (5) | Write $L_2$ into W. Subtract R and C from $L_2$ and place the result in $L_2$ and the carry in C | 1 | 0 | 0 | 4 |
| (6) | Add R to $L_2$ and C, placing the sum in W and the carry in C | 1 | 0 | 1 | 5 |
| (7) | Write $L_1$ into W, subtract R and C from $L_1$ placing the result in $L_2$ and the carry in C | 1 | 1 | 0 | 6 |
| (8) | Add R to C and $L_1$, place the sum in W and the carry in C | 1 | 1 | 1 | 7 |

The logical operations performed according to the instructions in Table 3 proceeds in four phases. In a first phase, the output of the encoder is sampled and the bi-level signal combination existing at the brushes $B_1$, $B_2$, $B_3$ is used to provide a corresponding signal combination in the $L_1$, $L_2$, $L_3$ flip-flops respectively, in response to instruction (1). In a second phase, the Gray code number represented by the output of the $L_1$, $L_2$, $L_3$ flip-flops is converted into the binary code representation of the same number, in response to instruction (2).

In the third phase of the operation, the contents of $L_1$, $L_2$, $L_3$ are first sequentially written into the W or write flip-flop of the storage register 72. Next, they are individually combined in arithmetic subtraction with the signal output of the R or read flip-flop of the register 72, representing the prior encoder position, which was recorded in the prior sampling interval. The arithmetic difference is held in the $L_1$, $L_2$, $L_3$ flip-flops, and, during the subtraction process, the borrow, if any, is held in the C flip-flop. This phase, under control of instructions (3), (5) and (7), is repeated and the present first difference, stored in the $L_1$, $L_2$, $L_3$ flip-flops is written into the storage register 72, and at the same time is subtracted from a prior first difference provided by the register 72. The resulting signal combination, representing the second difference, is held in $L_1$, $L_2$, $L_3$.

In the fourth phase, the signals representing the second difference value are added to the contents of the storage register 72 which, at this instant contains the bilevel signals representative of the digits of a number corresponding to velocity or first rate of change of the shaft 60. In successive steps, the contents of each of the flip-flops $L_1$, $L_2$, $L_3$ is added to a digit appearing in the R flip-flop. The result is placed in the W flip-flop which enters the result into the storage register 72. The carry, if any, is set into the C flip-flop. Second difference quantities which are to be considered negative numbers, are expressed as sevens complement, which, for subtractive purposes, are also added to the quantity appearing in the R flip-flop in successive bit times. These operations are performed in response to instructions (4), (6), and (8).

Table 4 lists each of the instructions and the logical equations describing the function accomplished by each:

*Table 4*

| Octal | | Octal | |
|---|---|---|---|
| | $\overline{P}_1\overline{P}_2\overline{P}_3$ | | $\overline{P}_1\overline{P}_2\overline{P}_3$ |
| 0–1 | Set $L_1=\overline{L}_1B_1\overline{S}'C_p$ | 4–1 | Set $L_2=\overline{L}_2(R\overline{C}+\overline{R}C)\overline{S'}C_p$ |
| 0–2 | Zero $L_1=(L_1\overline{B}_1+S')C_p$ | 4–2 | Zero $L_2=L_2(R\overline{C}+\overline{R}C+S')C_p$ |
| 0–3 | Set $L_2=\overline{L}_2\overline{B}_2\overline{S}'C_p$ | 4–3 | Set $C=\overline{CL_2}RC_p$ |
| 0–4 | Zero $L_2=(L_2\overline{B}_2+S')C_p$ | 4–4 | Zero $C=CL_2\overline{R}C_p$ |
| 0–5 | Set $L_3=\overline{L}_3B_3\overline{S}'C_p$ | 4–5 | Set $W=L_2\overline{S}'C_p$ |
| 0–6 | Zero $L_3=(L_3\overline{B}_3+S')C_p$ | 4–6 | Zero $W=\overline{\text{Set }W}C_p$ |
| | $\overline{P}_1\overline{P}_2P_3$ | | $P_1\overline{P}_2P_3$ |
| 1–1 | Set $L_2=\overline{L}_2L_1C_p\overline{S}'$ | 5–1 | Set $C=\overline{C}L_2RC_p$ |
| 1–2 | Zero $L_2=(L_2L_1+S')C_p$ | 5–2 | Zero $C=C\overline{L}_2\overline{R}C_p$ |
| 1–3 | Set $L_3=\overline{L}_3(L_1\overline{L}_2+\overline{L}_1L_2)C_p\overline{S}'$ | 5–3 | Set $W=[\overline{C}(R\overline{L}_2+\overline{R}L_2)+C(RL_2+\overline{RL_2})]SC_p$ |
| 1–4 | Zero $L_3=L_3(L_1\overline{L}_2+\overline{L}_1L_2+S')C_p$, | 5–4 | Zero $W=\overline{\text{Set }W}C_p$ |
| | $\overline{P}_1P_2\overline{P}_3$ | | $P_1P_2\overline{P}_3$ |
| 2–1 | Set $L_3=\overline{L}_3R\overline{S}'C_p$ | 6–1 | Set $L_1=\overline{L}_1(R\overline{C}+\overline{R}C\overline{S'})C_p$ |
| 2–2 | Zero $L_3=(L_3R+S')C_p$ | 6–2 | Zero $L_1=L_1(R\overline{C}+\overline{R}C+S')C_p$ |
| 2–3 | Set $C=\overline{CL_3}RC_p$ | 6–3 | Set $C=\overline{CL_1}RC_p$ |
| 2–4 | Zero $C=CL_3\overline{R}C_p$ | 6–4 | Zero $C=CL_1\overline{R}C_p$ |
| 2–5 | Set $W=L_3\overline{S}'C_p$ | 6–5 | Set $W=L_1\overline{S}'C_p$ |
| 2–6 | Zero $O=\overline{\text{Set }W}C_p$ | 6–6 | Zero $W=\overline{\text{Set }W}C_p$ |
| | $\overline{P}_1P_2P_3$ | | $P_1P_2P_3$ |
| 3–1 | Set $C=\overline{C}L_3RC_p$ | 7–1 | Set $C=\overline{C}L_1RC_p$ |
| 3–2 | Zero $C=C\overline{L}_3RC_p$ | 7–2 | Zero $C=C\overline{L}_1\overline{R}C_p$ |
| 3–3 | Set $W=(R\overline{L}_3+\overline{R}L_3)SC_p$ | 7–3 | Set $W=[C(R\overline{L}_1+\overline{R}L_1)+C(\overline{RL_1}+RL_1)]SC_p$ |
| 3–4 | Zero $W=\overline{\text{Set }W}C_p$ | 7–4 | Zero $W=\overline{\text{Set }W}C_p$ |

The particular logical equations, mechanized in the logic circuit 70, are set out in Table 5 below.

*Table 5*

$$\text{Set } L_3=\overline{L}_3C_p\overline{S}'[\overline{P}_1\overline{P}_2\overline{P}_3B_3+\overline{P}_1\overline{P}_2P_3(L_1\overline{L}_2+\overline{L}_1L_2)+\overline{P}_1P_2\overline{P}_3R] \quad (1)$$

$$\text{Zero } L_3=L_3C_p[S'+\overline{P}_1\overline{P}_2\overline{P}_3\overline{B}_3+\overline{P}_1\overline{P}_2P_3(L_1\overline{L}_2+\overline{L}_1L_2)+\overline{P}_1P_2\overline{P}_3R] \quad (2)$$

$$\text{Set } L_2=\overline{L}_2C_p\overline{S}'[\overline{P}_1\overline{P}_2\overline{P}_3B_2+\overline{P}_1\overline{P}_2P_3L_1+P_1\overline{P}_2\overline{P}_3(R\overline{C}+\overline{R}C)] \quad (3)$$

$$\text{Zero } L_2=L_2C_p[S'+\overline{P}_1\overline{P}_2\overline{P}_3\overline{B}_2+\overline{P}_1\overline{P}_2P_3L_1+P_1\overline{P}_2\overline{P}_3(R\overline{C}+\overline{R}C)] \quad (4)$$

$$\text{Set } L_1=\overline{L}_1C_p\overline{S}'[\overline{P}_1\overline{P}_2\overline{P}_3B_1+P_1P_2\overline{P}_3(R\overline{C}+\overline{R}C)] \quad (5)$$

$$\text{Zero } L_1=L_1C_p[S'+\overline{P}_1\overline{P}_2\overline{P}_3\overline{B}_1+P_1P_2\overline{P}_3(R\overline{C}+\overline{R}C)] \quad (6)$$

$$\text{Set } C=\overline{C}C_p\overline{S}'[\overline{P}_1P_2\overline{P}_3\overline{L}_3R+\overline{P}_1P_2P_3L_3R+P_1\overline{P}_2\overline{P}_3\overline{L}_2R+P_1\overline{P}_2P_3L_2R+P_1P_2\overline{P}_3\overline{L}_1R+P_1P_2P_3L_1R] \quad (7)$$

$$\text{Zero } C=CC_p[S'+\overline{R}[\overline{P}_1P_2\overline{P}_3L_3+\overline{P}_1P_2P_3\overline{L}_3+P_1\overline{P}_2\overline{P}_3L_2+P_1\overline{P}_2P_3\overline{L}_2+P_1P_2\overline{P}_3L_1+P_1P_2P_3\overline{L}_1]] \quad (8)$$

$$\text{Set W to Write ``1''}=C_p[\overline{S}'\overline{P}_3(\overline{P}_1P_2\overline{L}_3+P_1\overline{P}_2\overline{L}_2+P_1P_2L_1)+SP_3[P_1P_2(R\overline{L}_3+\overline{R}L_3)+P_1\overline{P}_2[C(R\overline{L}_2+\overline{R}L_2)+C(RL_2+\overline{RL_2})]+P_1P_2[C(R\overline{L}_1+\overline{R}L_1)+C(RL_1+\overline{RL_1})]]] \quad (9)$$

$$\text{Zero W to Write ``0''}=\overline{\text{Write}}\ \overline{1}\ C_p \quad (10)$$

Figure 5:
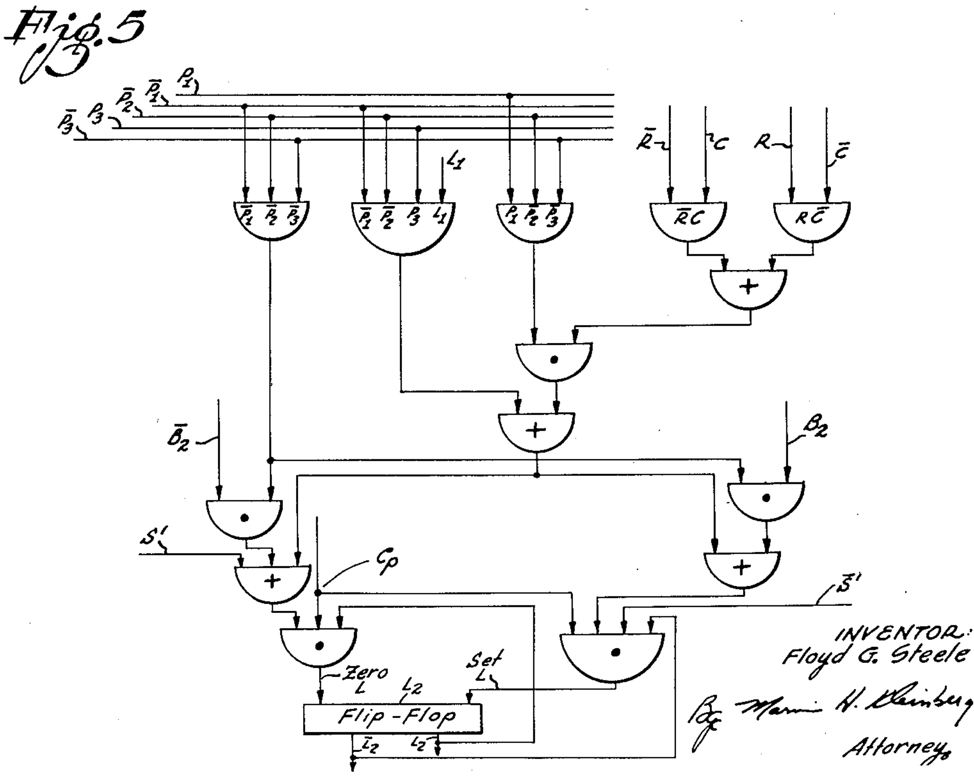
FIGURE 5 is a block diagram of logic circuits suitable for use in the embodiment of FIGURE 4.

With reference to FIGURE 5, there is shown, in block diagram form, a combination of logical elements suitable for applying setting and zeroing signals to the $L_2$ flip-flop of FIGURE 4. The gates shown in FIGURE 5 are a direct mechanization of the logical Equations 3 and 4 set forth above, and determine the state of the $L_2$ flip-flop of FIGURE 4.

It may be seen that similar logical circuits may be used to control the other flip-flops of FIGURE 4 and, given the above logical equations, persons skilled in the art may easily assemble the circuits mechanizing the equations.

Figure 6:
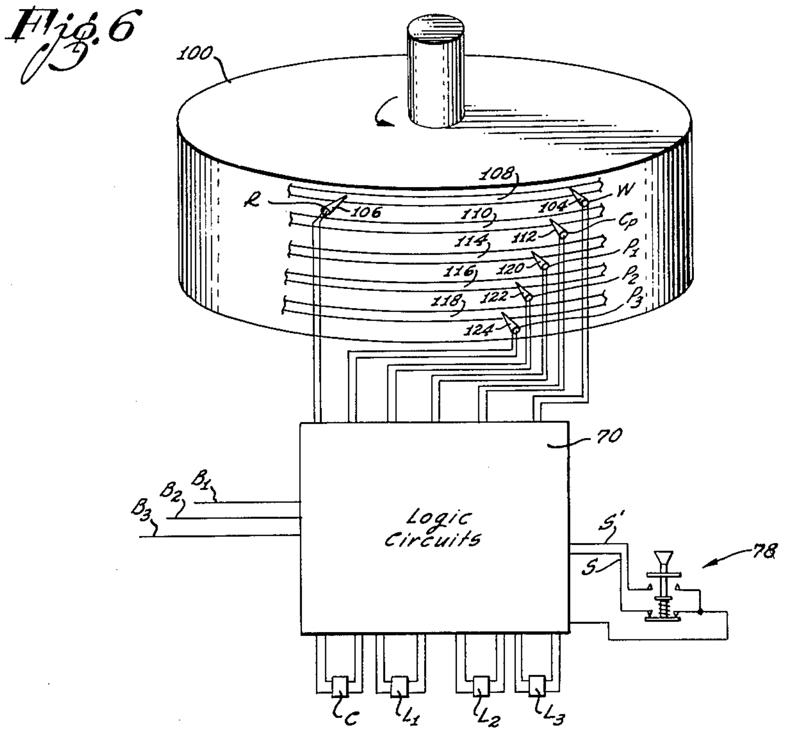
FIGURE 6 is an idealized, isometric view of a magnetic drum incorporated into the present invention.

With reference to FIG. 6, there is shown a magnetic drum device suitable for use in the preferred embodiment of the present invention. A cylinder 100, having a magnetizable surface, is connected to a source of rotational motion (not shown). A write head 104 and a read head 106 are aligned to cooperate in a single circumferential channel 108 of the cylinder 100 and information represented by states of magnetization may be recorded and stored therein. The write head 104 is connected to the logic circuits 70 and receives information signals to be written in the channel 108. The read head 106 is connected to the logic circuit 70 and applies signals representing information stored in the channel 108. A second circumferential channel 110, contains a series of magnetized timing marks, and a $C_p$ read head 112 is positioned to detect these marks and provide timing signals $C_P$ to the logic circuit 70. Three additional channels 114, 116 and 118 respectively contain program signals, and a set of program read heads 120, 122, 124 apply program signals $P_1$, $P_2$, $P_3$, respectively, to the logic circuit 70.

In operation, and with reference to the figures, assume, for example, that it is desired to determine the angular velocity and the total angular displacement of the shaft 60 of the motor 12 which could be an element in a servo system. It may be assumed that the motor 12 drives in both the clockwise or positive direction, and counter-clockwise or negative direction, and that the velocity is unbounded.

The magnetic drum 100 of FIG. 6 is in rotation and signals are being constantly recorded and read. The position encoder 62 of FIG. 4 is coupled to the servo motor 12 which is initially at rest. The start push button, 78 having contacts to generate signals "S′," at the open position and "S" at the closed position, is depressed to open the one set of contacts. The S′ signal from the depressed start button applies zeroing input signals to all of the logic flip-flops and to the W flip flop. When the button 78 is released, a finite time interval elapses before the closed position is reached and the signal S is generated during which time the signal $\overline{S}'$ is generated. $\overline{S}'$ is the complement of the S′ signal, and permits the initial position of the encoder 62 to be recorded in the register 72. When the start button 78 reaches the closed position, the signal S is generated in addition to the signal $\overline{S}'$. The signal S enables the addition of the computed second difference to the velocity number portion of the register 72 which has been zeroed or set to some initial value.

The servo motor 12 is initially at a rest position which results in an encoder code combination of 000. As the motor 12 is energized, the shaft 60 rotates to a first position which provides a Gray signal combination of 001.

At instruction 1, the brushes, $B_1$, $B_2$, $B_3$, are sampled for high and low level states which determine the states of the logic flip-flops $L_1$, $L_2$, $L_3$, respectively. The signal 001 from the brushes sets the $L_3$ flip-flop and zeroes the $L_1$ and $L_2$ flip-flops to produce signals $\overline{L}_1$, $\overline{L}_2$, $L_3$, which are interpreted as 001. Instruction 2 converts the Gray code combination to the equivalent binary code representation, 001, and in this instance, the contents of the flip-flops remain unchanged.

Under control of instruction 3, the contents of the $L_3$ flip-flop are written into the write circuit 104 of the register 72 for use in the next interval. During instruction 3, the read circuit 106 provides a binary signal representation of the state of brush $B_3$ during the immediately prior sampling, which, in this instance is a 0 or $\overline{R}$ signal. The "0" in the R flip-flop is subtracted from the "1" in the $L_3$ flip-flop and the result, a "1" is retained in $L_3$. A zeroing signal is applied to the C or carry flip-flop.

At instruction 5, the $B_2$ brush value of the prior sampling is read into the R flip-flop from the read circuit 106 and the current $B_2$ brush value in $L_2$ is written into the Write circuit 104 and placed in the register 72. The subtraction of the contents of the R and C flip-flops from the $L_2$ flip-flop leaves the contents of the $L_2$ flip-flop unchanged. Instruction 7 writes the contents of the $L_1$ flip-flop into the register 72 and the contents of the $L_1$ and C flip-flops remain unchanged. At the completion of instruction 7, the states of flip-flops $L_1$, $L_2$, $L_3$ represent a number, 001, which designates the first difference of position.

The first difference, which was recorded in the immediately prior interval, is detected in the register read circuit 106 and is applied to the R flip-flop. Instructions 3, 5, and 7 are repeated, storing a new first difference in the register 72 and subtracting the old first difference value from the present, "new" first difference. At the completion of the instruction sequence, the states of the logic flip-flops $L_1$, $L_2$, $L_3$ correspond to a number 001 which represents the second difference of position.

At instruction 4, the least significant digit of the velocity number appears in the read circuits 106 and is placed in the R flip-flop. This number is added to the least significant digit of the second difference which is stored in the $L_3$ flip-flop. The result is written in the write circuits 104 by the W flip-flop. In the present example, the "1" in $L_3$ is added to the "0" in R, resulting in a "1" being written into the register 72 and the C flip-flop is zeroed. During instructions 6 and 8, 0's are added to the register 72. Instruction 8 is repeated for as many times as there are digits assigned to the velocity number. By the end of the first sampling interval, the velocity portion of the register, which may have any desired number of binary digits, contains a number whose value is 1, representing a displacement of one quantum in one time interval from a stationary, start position.

For the purposes of the present example, assume that the velocity of the motor increases and by the end of the next sampling interval, the brushes $B_1$, $B_2$, $B_3$ provide a Gray code signal combination of 110, which indicates a change of 3 quanta during the sampling interval. The brushes are read into $L_1$, $L_2$, and $L_3$ and the reading is converted into the binary code equivalent, 100.

As before, the contents of the $L_1$, $L_2$, $L_3$ flip-flops are copied into the register 72 and the stored old brush value, 001, is subtracted from the new value, 100. At instruction 3, subtracting R from $L_3$ results in a "1" in $L_3$ and a "1" in C. At instruction 5, the quantities in C and R are subtracted from the quantity in $L_2$ and the resulting "1" is written in $L_2$ and with a carry in C. At instruction 7, R and C are subtracted from $L_1$ leaving "0" in both $L_1$ and C.

The first difference, 011, is written in the register 72 and the prior first difference, 001, already in the register 72, circulates to the R flip-flop to be subtracted from the current first difference. The result of the subtraction, 010, is held in $L_1$, $L_2$ and $L_3$ and is added to the velocity number in the velocity portion of the register. The digits of the velocity number appear in R and are combined with digits in $L_3$, $L_2$, and $L_1$. At the completion of the sampling interval, the register stores, in order of presentation to the Read circuits 106, digits 0, 0, 1, 1, 1, 0, 1, 1, 0 . . . which represent, in order, a new brush reading in binary code, 100, a new first difference, 011, and a velocity, . . . 011.

It may be seen that additional increments of velocity may be added to increase the number in the velocity register as the motor accelerates. When the acceleration ceases, the velocity becomes constant and the second difference becomes 0 which, when added to the velocity number, produces no change.

Figure 7:
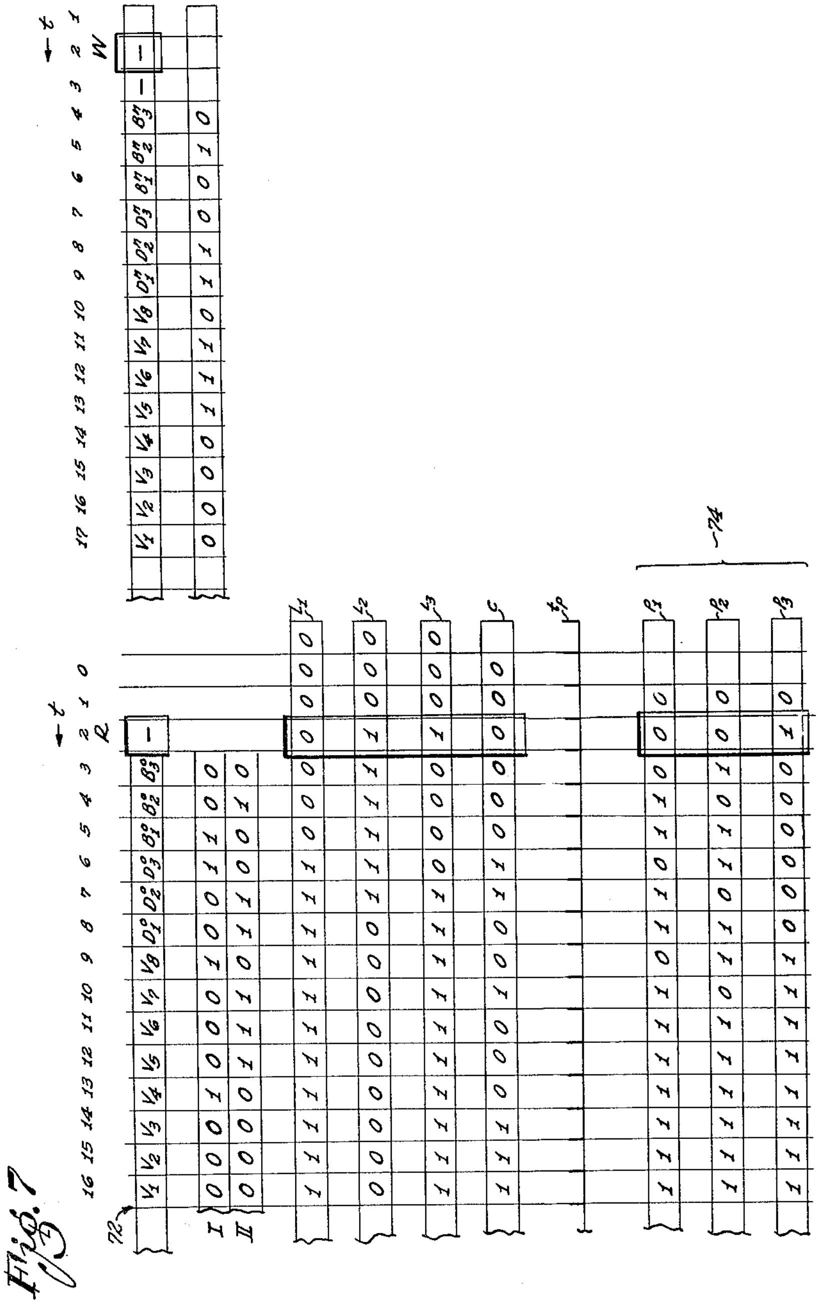
FIGURE 7 is a diagram of the register and flip-flops during sampling intervals indicating the contents thereof.

FIGURE 7 represents the states of the various circuits during a sampling interval. The R and W flip-flops are shown as windows in the register 72 so that the contents at a particular interval may be identified. In separate blocks the program register 74 is set out in alignment with the storage register 72.

The contents of the storage register 72 for two time intervals I and II are aligned with the cells of register 72 containing an indication of the significance of the signals stored. $B_1^o$, $B_2^o$, $B_3^o$ represent old brush values, $D_1^o$, $D_2^o$, $D_3^o$ represent old first difference values, and $V_1$ through $V_8$ represent the velocity number. In the write portion of the register, the signals written away as a result of logical operations are designated $B_1^n$, $B_2^n$, $B_3^n$, representing new brush values $D_1^n$, $D_2^n$, $D_3^n$ representing new first differences and $V_1$ through $V_8$ for the revised velocity value. The states of $L_1$, $L_2$, $L_3$, and C are indicated aligned with the corresponding simultaneous state of the register.

To continue the example and with reference to FIGURE 7, assume that a decelerating signal is applied to the servo motor 12 which has been rotating at a constant velocity of 17 quanta per sampling interval. The register 72, contains the following information: an old brush value of 100, an old first difference of 001, and, assuming an 8 digit velocity number, a velocity value of 00010001. In the next sampling interval, the new brush reading, $B_1$, $B_2$, $B_3$ is 011 which after staticizing and conversion becomes 010 in $L_1$, $L_2$, and $L_3$. The old brush value, 100, is subtracted from the new brush value, 010, and the resultant value, 110, which is the first difference, is retained in $L_1$, $L_2$, and $L_3$ and is stored in the register 72. The subtraction process is repeated and the resulting second difference, 101, is held in the logic flip-flops.

The choice of assigned digital values permits the representation of a negative quantity by a binary number which is the seven's complement of the absolute value. In an additive process, addition of the seven's complement results in a subtraction. The value 101, which is 5 in binary code and represents −3, is the seven's complement of 3 which, when added to a quantity, subtracts 3.

At the fourth instruction, the "1" in $L_3$ is added to the "1" in R, and the result, a "0," is written in the register and a "1" is set into the C flip-flop 74. In the sixth step, the "0" in $L_2$ and the "1" in C, are added to the "0" in R and the resulting "1" is written into the register.

Instruction 8 combines the "1" in $L_3$ with the "0" in R to place a "1" in the register. Instruction 8 is repeated for the remaining five digits in the velocity number. At the end of the sampling interval, the register 72 contains brush readings of 010, a first difference reading of 110, and a velocity of 0001110. The deceleration results in a change in velocity to a value of 14, representing a decrease in velocity of 3 quanta in that sampling interval. The repetition of instruction 8 in the addition process, assures that the sign of the second difference is correctly represented. The $L_1$ digit is "1" for negative second differences and is "0" for positive second differences.

Figure 8:
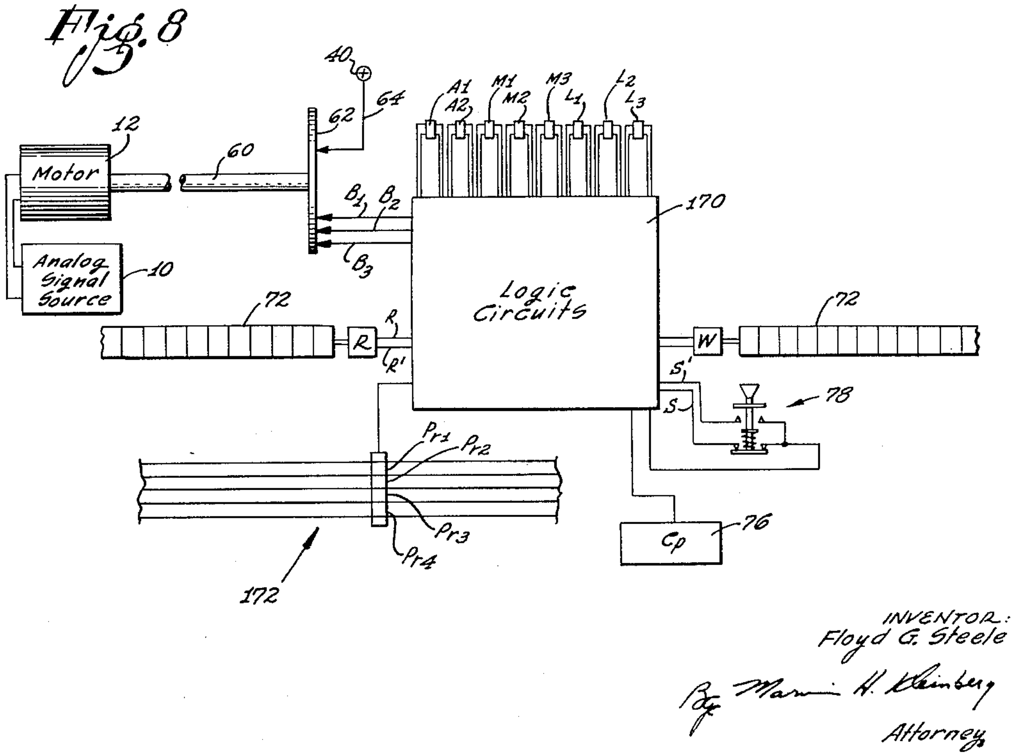
FIGURE 8 is a block diagram of an alternate embodiment of the present invention.

In an alternative embodiment of the present invention, the successive samplings of the brushes are stored in a storage device and three successive samplings are simultaneously compared to derive a value of the second difference. The second difference is then combined with a quantity in the storage register which represents a rate of change or velocity. With reference to FIG. 8, a block diagram is shown mechanizing the alternative embodiment.

The recirculating register 72 is connected to the R flip-flop and the W flip-flop. Both flip-flops are connected to logic circuits 170. Connected to the logic circuits 170 are eight flip-flops, designated respectively as $A_1$, $A_2$, $M_1$, $M_2$, $M_3$, $L_1$, $L_2$, $L_3$.

A set of four program channels, respectively, designated $P_1$, $P_2$, $P_3$, $P_4$ make up a program register 172 to provide program instructions which are detected by four program read flip-flops $Pr_1$, $Pr_2$, $Pr_3$ and $Pr_4$.

In operation the logic circuits 170 carry out the following instructions:

*Table 6*

| Number | Binary | | | | Instructions |
|---|---|---|---|---|---|
| | $P_1$ | $P_2$ | $P_3$ | $P_4$ | |
| 0 | 0 | 0 | 0 | 0 | Do Nothing. |
| 1 | 0 | 0 | 0 | 1 | Read contents of brushes. |
| 2 | 0 | 0 | 1 | 0 | Copy R into $M_1$, copy $L_1$ into W. |
| 3 | 0 | 1 | 0 | 0 | Copy R into $M_2$, copy $L_2$ into W. |
| 4 | 1 | 0 | 0 | 0 | Copy R into $M_3$, copy $L_3$ into W. |
| 5 | 1 | 0 | 0 | 1 | Copy R into $A_1$, copy $M_1$ into W. |
| 6 | 1 | 0 | 1 | 0 | Copy R into $A_2$, copy $M_2$ into W. |
| 7 | 1 | 1 | 0 | 0 | Copy $M_3$ into W, combine R, $A_1$, $A_2$, $M_1$, $M_2$, $M_3$, $L_1$, $L_2$, $L_3$ into binary representation of the second difference. Place result in $L_1$, $L_2$, $L_3$. |
| 8 | 1 | 1 | 0 | 1 | Add R into $L_3$. Result in W, carry in $A_1$. |
| 9 | 1 | 1 | 1 | 0 | Add R and $A_1$ to $L_2$. Result in W, carry in $A_1$. |
| 10 | 1 | 1 | 1 | 1 | Add R and $A_1$ to $L_1$. Result in W, carry in $A_1$. |

The above listed instructions can be converted into logical equations using methods well known to the art. For example, the following equation can be used for setting the W or Write staticizer in the present embodiment.

$$\text{Set } W=\overline{P}_1\overline{P}_2P_3\overline{P}_4L_1+\overline{P}_1P_2\overline{P}_3\overline{P}_4L_2+P_1\overline{P}_2\overline{P}_3\overline{P}_4L_3 +P_1\overline{P}_2\overline{P}_3P_4M_1+P_1\overline{P}_2\overline{P}_3P_4M_2+P_1P_2\overline{P}_3\overline{P}_4M_3 +P_1P_2\overline{P}_3P_4(L_3\overline{R}+\overline{L}_3R)+P_1P_2P_3\overline{P}_4[L_2(A_1R +\overline{A}_1\overline{R})+\overline{L}_2(A_1\overline{R}+\overline{A}_1R)]+P_1P_2P_3P_4[L_1(A_1R +\overline{A}_1\overline{R})+\overline{L}_1(A_1\overline{R}+\overline{A}_1R)]$$

In a similar fashion, equations can be derived to set the $L_1$, $L_2$, and $L_3$ flip-flops, the $M_1$, $M_2$ and $M_3$ flip-flops, and the $A_1$ and $A_2$ flip-flops, which are quite extensive, and involve many complex terms. It is felt, however, that the inclusion of such additional equations adds nothing to the description, and would tend only to confuse the reader. Accordingly, the remaining equations have been omitted, although one skilled in the art could easily derive them.

Thus there has been shown a combination for sampling the output of an analog to digital quantizer and deriving from the successive samplings, a quantity representing the second difference of succesive samplings. The second difference may be added directly to a stored first difference quantity to provide a current value of the first difference. If a quantized value of the total change is desired, the first difference may be applied to a summing circuit of the type well-known in the art, from which can be derived a quantity representing the total change in the analog signal. The circuits of the present invention provide a device which can operate on unlimited rates of change without the need of an intermediate buffer storage, or high sampling rates.

What is claimed as new is:

1. In a system for providing output signals representing velocity of a moving member including an encoding means coupled to the moving member for providing bivalued position signals representing the quantized position of said moving member relative to a reference position, the combination comprising: selective storage means for successively sampling the encoding means signals at predetermined times to store sampled position signals representing corresponding successive positions of said member at successive times of sampling; calculating means connected to said storage means and responsive to the sampled position signals representative of each three successive positions of said member for producing corresponding groups of signals representing the second differences of the quantities represented by the sampled position signals; and means responsive to said groups of signals for producing output signals representing the accumulated sum of the quantities represented by said groups of signals to provide a representation of velocity of said moving member.

2. In a system for providing output signals representing velocity of a moving member including an encoding means coupled to the moving member for providing bivalued code signals representing the quantized position of said moving member relative to a reference position and sampling means for successively sampling the code signals at predetermined intervals to provide sampled position signals representing corresponding successive positions of said member, the combination comprising: a storage device connected to said sampling means for storing the sampled position signals; calculating means connected to said sampling means and said storage device and responsive to sampled position signals representative of each three successive positions of said member for producing corresponding groups of signals representing the differences of the quantities represented by the sampled position signals; and means responsive to said groups of signals for producing output signals representing the accumulated sum of the quantities represented by said groups of signals to provide a representation of velocity of said moving member.

3. The combination of claim 2 wherein said storage device includes a channel on a magnetic drum and magnetic reading and writing means operable in conjunction therewith, means coupling said sampling means to said writing means for recording said sampled position signals, and means connecting said reading means to said calculating means for applying recorded sampled position signals to said calculating means.

4. A system for providing output signals representing velocity of a moving member comprising: encoder means coupled to the moving member for providing bivalued code signals representing the quantized position of said moving member relative to a reference position; sampling means for successively sampling the code signals at predetermined intervals to provide sampled position signals representing corresponding successive positions of said member; a storage device connected to said sampling means for storing the sampled position signals; calculating means connected to said sampling means and said storage device and responsive to sampled position signals representative of each three successive positions of said member for producing corresponding groups of signals representing the second differences of the quantities represented by the sampled position signals; and means responsive to said groups of signals for producing output signals representing the accumulated sum of the quantities represented by said groups of signals to provide a representation of velocity of said moving member.

5. In a system for providing output signals representing velocity of a moving member including an encoding means coupled to the moving member for providing bivalued code signals representing the quantized position of said moving member relative to a reference position and sampling means for successively sampling the encoding means signals at predetermined sampling times and responsive thereto to provide position signals representing corresponding successive positions of said member at successive sampling times, the combination comprising: a storage device connected to said sampling means for storing the sampled position signals; calculating means connected to said sampling means and said storage device and responsive to the position signals representative of each three successive positions of said member for producing corresponding groups of signals representing the second differences of the quantities represented by the position signals; and means responsive to said groups of signals for producing first output signals representing the accumulated sum of the quantities represented by said groups of signals to provide a representation of velocity of said moving member.

6. In a system for providing output signals representing velocity of a moving member including an encoding means coupled to the moving member for providing bivalued position signals representing the quantized position of said moving member relative to a reference position the combination comprising: selective storage means for successively sampling the encoding means signals at predetermined times to store sampled position signals representing corresponding successive positions of said member at successive times; calculating means connected to said storage device and responsive to the sampled position signals representative of each three successive positions of said member for producing corresponding groups of signals representing the second differences of the quantities represented by the sampled position signals; and means responsive to said groups of signals for producing output signals representing the accumulated sum of the quantities represented by said groups of signals to provide a representation of velocity of said moving member.

7. The combination of claim 6 wherein said selective storage means includes a magnetizable channel of rotating drum, magnetic reading and writing means for communicating with said magnetizable channel, means for connecting said writing means to said encoding means for recording sampled position signals, and means connecting said calculating means to said reading means for applying recorded sampled position signals to said calculating means.

8. A system for providing output signals representing velocity of a moving member comprising: encoding means coupled to the moving member for providing bivalued position signals representing the quantized position of said moving member relative to a reference position; selective storage means for successively sampling the encoding means signals at predetermined times to store sampled position signals representing corresponding successive positions of said member at successive times of sampling; calculating means connected to said storage means and responsive to the sampled position signals representative of each three successive positions of said member for producing corresponding groups of signals representing the second differences of the quantities represented by the sampled position signals; and means responsive to said groups of signals for producing output signals representing the accumulated sum of the quantities represented by said groups of signals to provide a representation of velocity of said moving member.

9. The system of claim 8 wherein said selective storage means includes a cyclically operable memory device having a storage loop, reading means for extracting information from said loop, writing means for entering information into said loop, means connecting said writing means to said encoding means for recording sampled position signals, and means connecting said reading means to said calculating means for applying recorded sampled position signals to said calculating means.

10. A system for providing output signals representing displacement of a moving member comprising: encoding means coupled to the moving member for providing bivalued position signals representing the quantized position of said moving member relative to a reference position; selective storage means for successively sampling the encoding means signals at predetermined times to store sampled position signals representing corresponding successive positions of said member at said predetermined times; calculating means connected to said storage means and responsive to the sampled position signals representative of each three successive positions of said member for producing corresponding groups of signals representing the second differences of the quantities represented by the sampled position signals; and means responsive to said groups of signals for producing output signals representing the doubly accumulated sum of the quantities represented by said groups of signals to provide a representation of displacement of said moving member.

11. A system for providing output signals representing the magnitude and direction of the velocity of a bidirectionally movable member comprising: bidirectional encoding means coupled to the moving member for providing bivalued position signals representing the quantized position of said member relative to a reference position; selective storage means for successively sampling the encoding means signals at predetermined times to store sampled position signals representing corresponding successive positions of said member at said predetermined times; calculating means connected to said storage means and responsive to the sampled position signals representative of each three successive positions of said member for producing corresponding groups of signals representing the second differences of the quantities represented by the sampled position signals; and means responsive to said groups of signals for producing output signals representing the accumulated sum of the quantities represented by said groups of signals to provide a representation of the direction and magnitude of the velocity of said member.

12. A system for providing output signals representing the magnitude and direction of the displacement of a bidirectionally movable member comprising: encoding means coupled to the member for providing bivalued code signals representing the direction and magnitude of the quantized position of said member relative to a reference position; sampling means for successively sampling the code signals at predetermined sampling times and responsive thereto to provide position signals representing corresponding successive positions of said member at successive sampling times; a storage device connected to said sampling means for storing the sampled position signals; calculating means connected to said sampling means and said storage device and responsive to the position signals representative of each three successive positions of said member for producing corresponding groups of signals representing the signs and magnitudes of the second differences of the quantities represented by the position signals; and means responsive to said groups of signals for producing output signals representing the doubly accumulated sum of the quantities represented by said groups of signals to provide a representation of the magnitude and direction of the displacement of said moving member.

13. In a system for providing first groups of output signals representing velocity of a moving member and second groups of output signals representing displacement of the moving member, including encoding means coupled to the moving member for providing a first group of bivalued signals representing the position of the moving member relative to a reference position, and sampling means connected to the encoding means for successively sampling said first signals at predetermined time intervals to successively produce corresponding second groups of sampled signals representative of the successive positions of the moving member at the times of sampling, the combination comprising: a memory device connected to said sampling means for storing said second groups of sampled signals; calculating means connected to said memory device and to said sampling means and responsive to said second groups of sampled signals to form third groups of signals representative of the second difference of the quantities represented by said second groups of sampled signals; first accumulating means connected to said calculating means and responsive to said third groups of signals for producing first groups of output signals representing the summation of the quantities represented by said second groups of signals, said first groups of output signals providing a representation of velocity of said moving member; and second accumulating means connected to said first accumulating means and responsive to said first groups of output signals for producing second groups of output signals representing the summation of the quantities represented by said first groups of output signals, said second groups of output signals providing a representation of displacement of said moving member.

14. In a system for providing output signals representing velocity of a moving member including encoding means coupled to said member for providing a serially ordered, plurality of combinations of bivalued signals, each of said combinations corresponding to a different position of said member, consecutive combinations of signals corresponding, respectively, to adjacent, incrementally spaced positions of said member, said encoding means being responsive to the position of said moving member to provide a corresponding combination of signals, the combination comprising: selective storage means connected to said encoding means for sampling said signal combinations at predetermined intervals to provide in response thereto corresponding sampled signals representing the position of said moving member at the time of sampling; a logical network connected to said selective storage means and responsive to sampled signals to produce successive first groups of difference signals representing the differences between the successive positions of said member at the times of sampling; said selective storage means being operable to store said first groups of difference signals; said logical network being responsive to consecutive groups of first difference signals for producing second groups of difference signals representing the second difference of the corresponding positions of said member; and accumulating means connected to said logical network and responsive to said second groups of difference signals for producing first output signals representing the rate of change of position of said moving member at the end of each of said predetermined intervals.

15. In the combination of claim 14, said accumulating means being responsive to said first output signals to produce second output signals representing the accumulated change in position at each of said predetermined intervals.

16. In a system for providing output signals representing velocity of a moving member including an encoding means coupled to the moving member for providing a first group of bivalued signals representing the position of the moving member relative to a reference position, and sampling means connected to the encoding means for successively sampling said first signals at predetermined time intervals to successively produce corresponding second groups of sampled signals representative of the successive positions of the moving member at the times of sampling, the combination comprising: a memory device for storing bivalued signals representing information; means interconnecting said memory device and said sampling means and operable for entering said second groups of sampled signals into said memory device; calculating means connected to said memory device and to said sampling means and responsive to said second groups of sampled signals to form third groups of signals representative of the second difference of the quantities represented by said second groups of sampled signals; and accumulating means connected to said calculating means and responsive to said third groups of signals for producing output signals representing the summation of the quantities represented by said second groups of signals, said output signals providing a representation of velocity of said moving member.

17. A system for providing output signals representing velocity of a moving member comprising: encoding means coupled to the moving member for providing a first group of bivalued signals representing the position of the moving member relative to a reference position; sampling means connected to the encoding means for successively sampling said first signals at predetermined time intervals to successively produce corresponding second groups of sampled signals representative of the successive positions of the moving member at the times of sampling; a memory device for storing bivalued signals representing information; means interconnecting said memory device and said sampling means and operable for entering said second groups of sampled signals into said memory device; calculating means connected to said memory device and to said sampling means and responsive to said second groups of sampled signals to form third groups of signals representative of the second difference of the quantities represented by said second groups of sampled signals; and accumulating means connected to said calculating means and responsive to said third groups of signals for producing output signals representing the summation of the quantities represented by said second groups of signals, said output signals providing a representation of velocity of said moving member.

18. In a system for providing output signals representing velocity of a moving member including an encoding means coupled to the moving member for providing a first group of bivalued signals representing the position of the moving member relative to a reference position, and sampling means connected to the encoding means for successively sampling said first signals at predetermined time intervals to successively produce corresponding second groups of sampled signals representative of the successive positions of the moving member at the times of sampling, the combination comprising: a memory device connected to said sampling means for storing said second groups of sampled signals; calculating means connected to said memory device and to said sampling means, and responsive to three of said second groups of sampled signals to form a third group of signals representative of the second difference of the three quantities represented by said three second groups of sampled signals; and accumulating means connected to said calculating means and responsive to said third groups of signals for producing output signals representing the summation of the quantities represented by said second groups of signals, said output signals providing a representation of velocity of said moving member.

19. The combination defined by claim 18 which further includes second accumulating means connected to said first named accumulating means and responsive to said output signals to produce displacement output signals representing the summation of the quantities represented by said output signals, said displacement output signals providing a representation of displacement of said moving member.

20. Apparatus for providing signals digitally representing the velocity of a moving member comprising: first means for providing first signals corresponding to a digital representation of the position of the moving member; second means connected to said first means and responsive to said first signals for providing second signals corresponding to a digital representation of the second difference of position of the moving member; and third means connected to said second means and responsive to said second signals for providing third signals corresponding to the accumulated sum of the quantities represented by said second signals, said third signals being a digital representation of the velocity of the moving member.

21. The apparatus of claim 20 above, further including fourth means connected to said third means and responsive to said third signals for providing fourth signals corresponding to a digital representation of the net displacement of the moving member.

22. A method for providing a digital representation of the velocity of a moving member comprising the steps of: sampling at periodic intervals to provide digital signals representing the position of the moving member; subtracting digital signals representing position at a first interval from digital signals representing position at the next successive interval to derive digital signals representing a first difference of position; subtracting digital signals representing first differences at a first interval from digital signals representing first difference at the next successive interval to derive signals representing a second difference of position; and summing digital signals representing successive second differences to provide digital signals representing velocity of the moving member expressed as a calculated first difference of position.

23. The method of claim 22 further including the step of summing said digital signals representing velocity of the moving members expressed as successive calculated first differences of position to provide digital signals representing displacement of the moving member.

References Cited in the file of this patent

UNITED STATES PATENTS

| | | |
|---|---|---|
| 2,685,054 | Brenner et al. | July 27, 1954 |
| 2,698,427 | Steele | Dec. 28, 1954 |
| 2,729,773 | Steele | Jan. 3, 1956 |
| 2,733,430 | Steele | Jan. 31, 1956 |
| 2,775,727 | Kernahan et al. | Dec. 25, 1956 |
| 2,789,761 | Merrill et al. | Apr. 23, 1957 |
| 2,823,344 | Ragland | Feb. 11, 1958 |
| 2,850,232 | Hagen et al. | Sept. 2, 1958 |